United States Patent Office 3,721,843
Patented Mar. 20, 1973

3,721,843
RECTIFIER ASSEMBLY FOR BRUSHLESS EXCITATION SYSTEMS
Andrew J. Spisak, Bethel Park, and Thayer L. Dillman, North Versailles, Pa., assignors to Westinghouse Electric Corporation, Pittsburgh, Pa.
Filed Mar. 6, 1972, Ser. No. 232,085
Int. Cl. H02k 11/00
U.S. Cl. 310—68
12 Claims

ABSTRACT OF THE DISCLOSURE

In a brushless excitation system rectifier diodes, heat sinks, capacitors, fuses and other circuit components are assembled in a modular assembly and a plurality of modules are mounted on support wheels and connected in a rectifier circuit to form a rotating rectifier assembly.

BACKGROUND OF THE INVENTION

The present invention relates to brushless excitation systems for alternating current generators, and more particularly to an improved construction and arrangement of the rotating rectifier assembly of such excitation systems.

Brushless excitation systems are now widely used for supplying direct current field excitation to large alternating current generators. Such an excitation system includes an alternating current exciter having a stationary field structure and a rotating armature member. A rotating rectifier assembly is carried on a common shaft with the exciter armature and connected thereto to provide a direct current output. The output of the rectifier is supplied to the field winding of the main generator which also rotates with the exciter armature and rectifier. In this way an excitation system is provided which requires no commutator or slip rings and no sliding contacts.

The rectifier assembly for such an excitation system requires a large number of components including the semi-conductor diodes themselves, heat sinks, capacitors, resistors, fuses and the necessary connections and supports. All these devices must be mounted on wheels on the shaft in a manner to be adequately supported against the high rotational forces to which they are subjected in operation and as compactly as possible to minimize the overall size and space required. This has been done heretofore by mounting the components of the rectifier circuit on the cylindrical inside surfaces of the rims of the wheels in the manner shown in a patent to Hoover 3,371,235 or in our Pat. 3,590,291. The arrangements of these patents were intended for diodes of the stud-mounted type, and they have been entirely satisfactory in service.

More recently, however, semi-conductor diodes of the disc type, or pressure contact type, have become available. As disclosed in Petersen et al. Pat. 3,521,132, diodes of this type are very suitable for rotating rectifier assemblies as they have relatively large current-carrying capacity and can be cooled on both sides because of their disc-shaped configuration, so that they have a greatly increased output for a given volume as compared to previously available diodes. The use of the disc-type diodes is obviously advantageous because of their increased current capacity, but they introduce additional problems of increased heat dissipation and of mounting the diodes in a manner to obtain the proper contact pressure. Since contact to these devices is made on their flat surfaces by pressure contacts, it is necessary to mount them in such a way that when the rectifier assembly is at standstill sufficient force is applied to the diodes to provide the necessary contact pressure for at least a low current for test purposes, while at full operating speed the pressure must be sufficient to provide the necessary current-carrying ability for the full rated current of the diode. The pressure must not be permitted to become so great, however, that mechanical failure could occur.

The problem of mounting all the necessary components of the rectifier circuit with the disc-type diodes and with adequate heat sinks to dissipate the heat, together with satisfactory springs or other force applying means to provide the necessary contact pressures, has been an extremely difficult one. As pointed out above, the components must also be adequately supported against the high rotational forces which occur in service and must be mounted as compactly as possible because of the limited space available. These requirements have made the type of assembly previously used unsuitable for disc-type diodes so that a new and more suitable arrangement is necessary.

SUMMARY OF THE INVENTION

In accordance with the present invention, the rectifier diodes together with the other necessary circuit components are assembled in rectifier modules. The modules are complete assemblies in themselves which can be handled as unitary devices and which are provided with means for easily securing them in place on the support wheels and for removing them. The necessary number of such modules can then readily be mounted in place on the wheels and suitably connected together to form the complete rectifier circuit.

Each module, in the preferred embodiment, has a base member which is preferably a metal container in which capacitors may be disposed, and one or more diode assemblies are placed on the base member. Each diode assembly consists of a disc-type diode placed between two heat sinks, and springs are provided for applying the necessary force to the diode assembly to maintain the desired contact pressures between the heat sinks and the diode. A fuse is attached to the base member and the diode assemblies, capacitors and fuse are connected together. Any necessary voltage-dividing resistors or other components may also be included. This entire assembly constitutes a module which can be handled as a unitary element or sub-assembly, and the necessary number of modules is mounted on two adjacent rectifier wheels. The rectifier modules are arranged so that they are of opposite polarity on the two wheels, and direct connections between corresponding modules on the two wheels then result in a three-phase rectifier bridge circuit.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
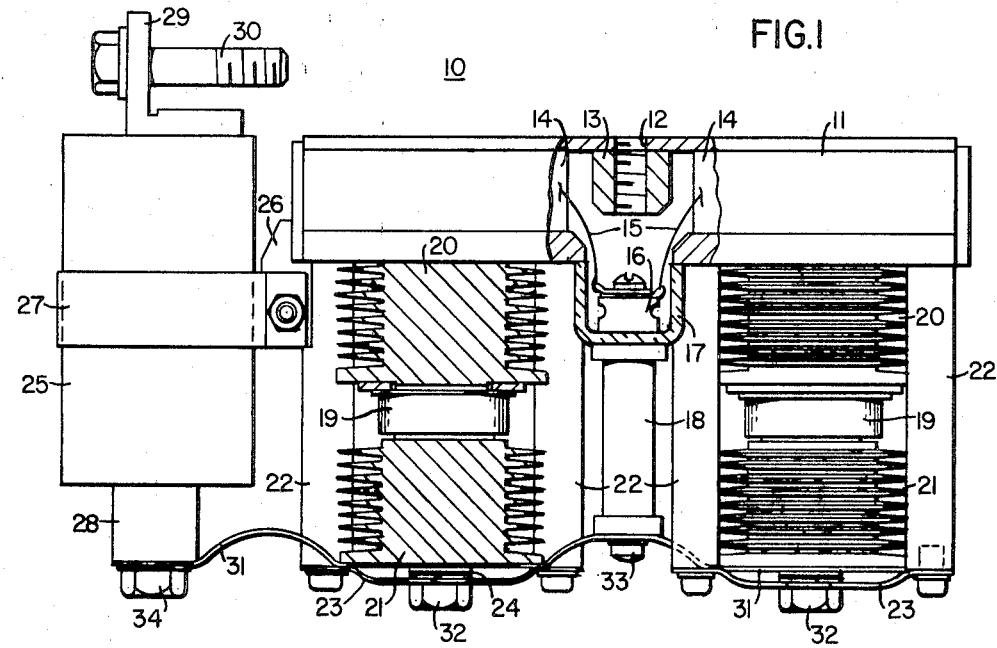
FIG. 1 is a view in elevation and partly in section of a rectifier module embodying the invention.
Figure 2:
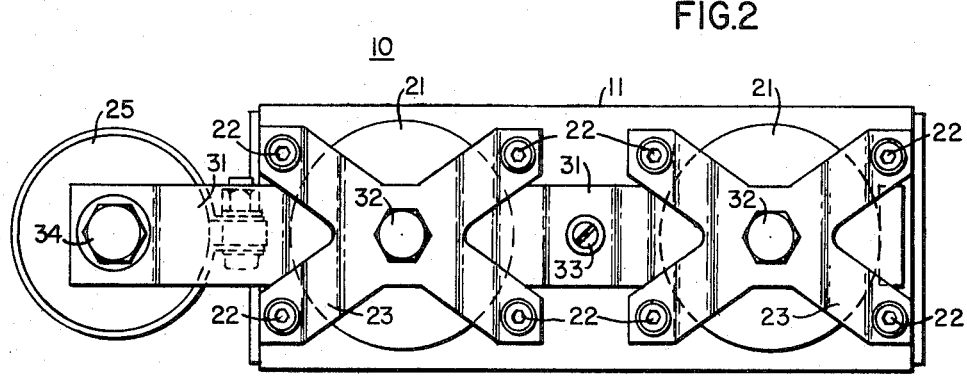
FIG. 2 is a bottom view of the rectifier module of FIG. 1.

As previously indicated, the present invention involves the use of a modular rectifier assembly, a plurality of modules being used to make up the complete rotating rectifier. A rectifier module 10 of the preferred construction is shown in FIGS. 1 and 2.

The rectifier module 10 includes a conducting base member 11 which is preferably in the form of a hollow container, such as a rectangular box as shown in the drawings, and is preferably made of aluminum or other conductive material of sufficient strength. A mounting hole 12 is provided in the upper surface of the base member 11 and an internally threaded bushing 13 is soldered or otherwise secured to the inside of the top of the base member in alignment with the hole 12 for the reception of a mounting bolt. One or more capacitors 14 are disposed within the hollow base member 11 in electrical contact therewith. The capacitors may be of any suitable type having one terminal suitable for contact with the container 11, and they may be secured in place by a suitable resin, such as an epoxy, or by any other means which will hold them firmly in place. The other terminals of the capacitors 14 are provided with leads 15 connected to a metal terminal member 16 which is carried in a cup 17 of insulating material attached over an opening in the lower surface of the base member 11. A conductive member 18, such as a steel rod, extends downwardly from the cup 17 and is in electrical contact with the terminal 16 to provide means for connection to the capacitors 14.

One or more diode assemblies are disposed on the base member 11. In the preferred embodiment shown in the drawings, two such assemblies are provided. Each assembly consists of a rectifier diode 19 of the disc, or pressure contact, type and two heat sinks 20 and 21. The heat sinks may each be a block of aluminum or copper, or other suitable electrically and thermally conducting material capable of acting as a heat sink, preferably having peripheral fins as shown to increase the radiating surface and heat dissipating ability. The mass of the heat sinks is made such that at the normal operating speed of the rotating rectifier assembly, the force applied to the diode 19 is sufficient to provide the required electrical contact pressure and current-carrying ability but not great enough to exceed the minimum force which would cause mechanical damage to the diode. The upper heat sink 20 directly engages the conductive base member 11 and the diode 19 is in electrical contact with both the heat sinks 20 and 21.

The diode assemblies are held in place on the base 11 by a spring support which also provides the desired contact pressure at standstill. For this purpose each diode assembly is provided with four insulating posts or standoff insulators 22 of any suitable type which are secured to the base member 11. The posts 22 are placed in a generally rectangular arrangement around each diode assembly, as can be seen in FIG. 2, and support a spring member 23 which may be made of spring steel or other suitable material. The spring members 23 are of generally X-shaped configuration with their extremities attached to the lower ends of the four posts 22. The center of the spring 23 engages the lower heat sink 21, a suitable number of shims or spacers 24 being inserted between the spring and the heat sink to obtain the desired spring deflection and spring force on the diode assembly. The spring force is made sufficient to provide the necessary pressure to hold the diode assembly in position against the base member when the rectifier assembly is at standstill, and to provide the necessary contact pressure to carry at least a small current for test purposes when the assembly is at standstill. If desired, however, the spring force could be made great enough to provide part or all of the contact pressure necessary during normal operation or to provide for any desired current-carrying capacity at standstill.

A fuse 25 is also provided as part of the rectifier module. The fuse 25 may be any suitable type of fuse capable of operation at high rotational speed and is attached to a lug 26 on one end of the base member 11 by means of a clamp 27. The fuse has a lower terminal 28 and an upper terminal 29 which is adapted to be connected to a rectifier wheel and for that purpose is drilled to receive a bolt 30 which is preferably captivated in the terminal 29. The elements of the rectifier module 10 are electrically connected by means of copper strap connector 31 which extends across the assembly. The connector 31 is attached to the two lower heat sinks 21 by means of screws 32 which extend through openings at center of the springs 23 and are threaded into the heat sinks. The connector 31 is also connected to the lower end of the conducting member 18 by a screw 33 and to the terminal 28 of the fuse 25 by a screw 34. Thus, the two diode assemblies are connected in parallel, with the capacitors 14 connected across them, and the fuse 25 is in series with the diodes. It will also be seen that the module constitutes a unitary assembly which can be handled as such and which can readily be assembled as a unit into the complete rotating rectifier.

Figure 3:
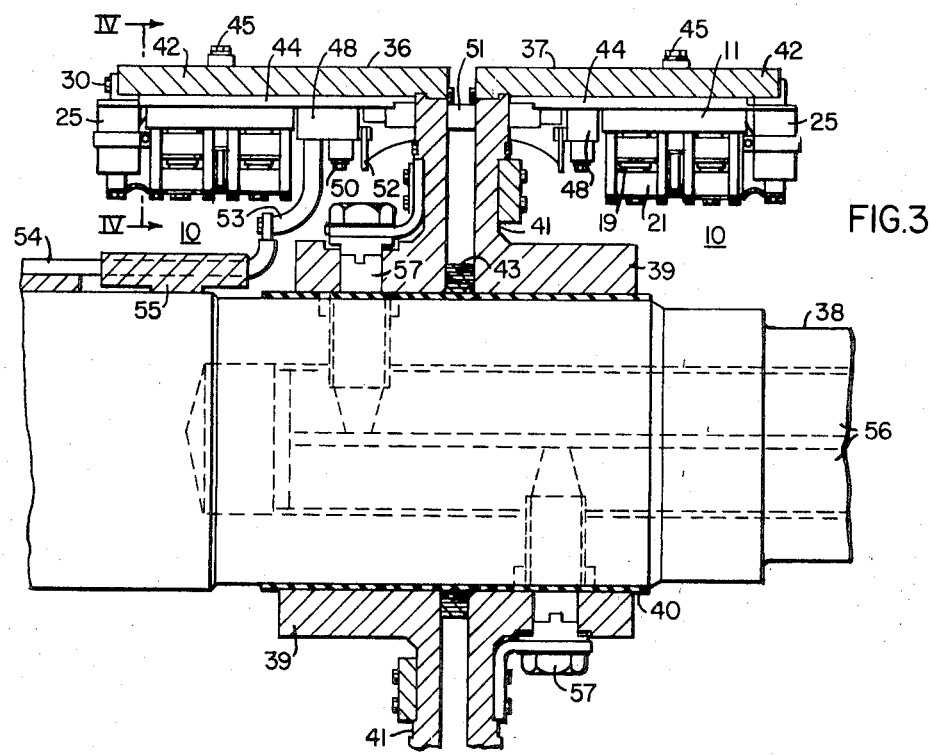
FIG. 3 is a longitudinal sectional view of a rotating rectifier assembly.
Figure 4:
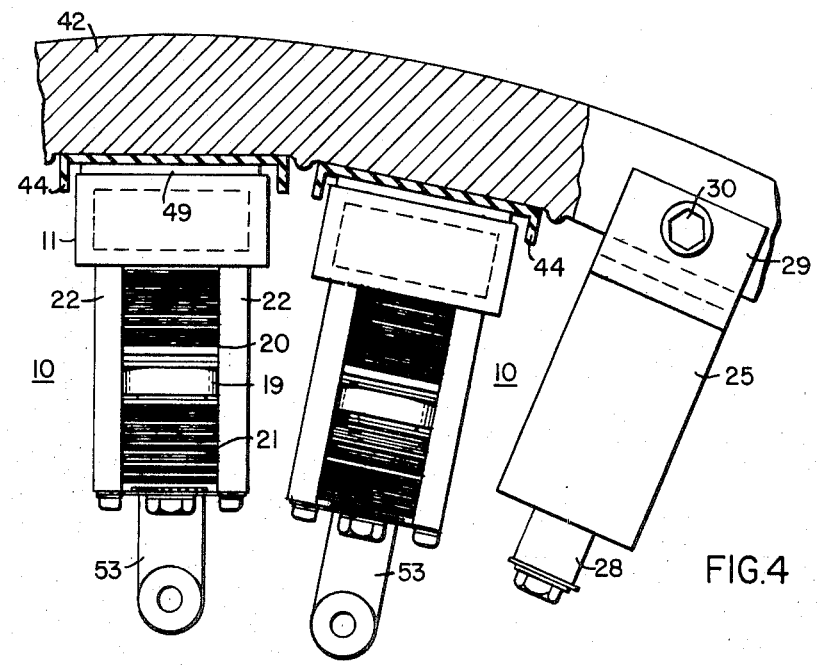
FIG. 4 is a fragmentary end view, partly in section on the line IV—IV of FIG. 3.

A typical rotating rectifier assembly in which the modules 10 may be used is shown in FIGS. 3 and 4. As there shown, two rectifier wheels 36 and 37 are mounted on a shaft 38. The two wheels are of similar construction and each wheel has a hub portion 39 which engages the shaft 38 but is insulated therefrom by a layer of suitable insulating material indicated at 40. Each wheel also has a radial flange portion 41 which may be integral with the hub portion 39 and a longitudinally extending dim 42 which is generally cylindrical and which extends axially in one direction from the radial flange 41. The two wheels 36 and 37 are mounted on shaft 38 in back-to-back relation as shown, that is, the rims 42 extend in opposite directions and the wheels are preferably separated by an insulating spacer 43.

Figure 7:
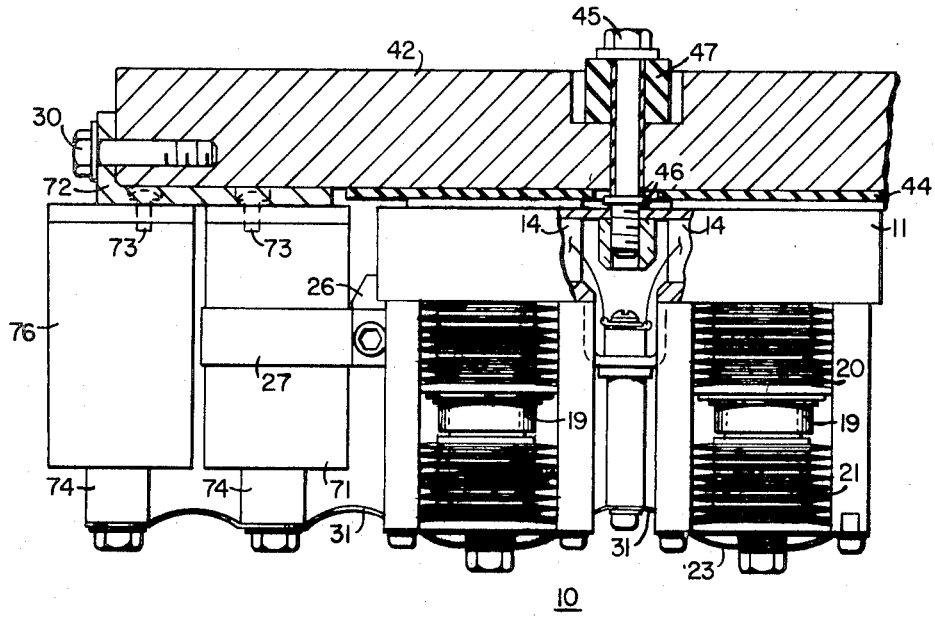
FIG. 7 is a view similar to FIG. 3 showing a somewhat modified rectifier module.

A plurality of rectifier modules 10 is mounted on the inner cylindrical surface of each of the wheel rims 42. The base members 11 of the rectifier modules are secured to the rims 42 of the wheels but are insulated therefrom by insulating channels 44, or in any suitable manner. The modules 10 are mounted on the wheel rim 42 by means of the bolts 30 previously mentioned which are threaded into axial holes in the end of the rim portion 42, and the base member 11 of each module is attached to the wheel rim 42 by a bolt 45 threaded in the bushing 13. As shown in FIG. 7, the bolt 45 is preferably captivated as by a flange 46 and is insulated from the rim 42 by suitable insulating sleeves and spacers indicated at 47. The module 10 is secured to the rim 42 solely by the bolts 30 and 45, and it will be seen that these bolts are readily accessible from the outside of the wheel so that the module can easily be put in place as a unit and secured to the wheel or can readily be removed at any time if necessary. It will be understood that, if desired, the module could be secured to the wheel rim in other ways, as by bolts threaded into the rim from the inside for example.

A terminal member 48 is provided for each module and is electrically connected to the base member 11 as by a conductor 49 disposed in the insulating channel 44. The terminal 48 may simply be a conductive block attached to the wheel by a bolt 50, and the terminals 48 of corresponding modules on the two wheels are connected by longitudinal conductors 51 which extend through openings in the flange portions 41 of the wheels. If desired, resistors 52 may be attached to the terminal members 48 and connected to the wheel flanges 41 as shown so that they are connected across the rectifier modules. The terminal members 48 on one of the wheels, shown as the wheel 36, are also provided with leads 53 for connection to leads 54 from the alternating current exciter which forms part of the brushless excitation system. The leads 54 extend along the shaft 38 and may be supported by any suitable supporting means as indicated at 55. The rectifier wheel rims and flanges also form part of the rectifier circuit and are connected to axial leads 56 extending through a bore in the shaft 38 by means of radial connectors 57, as more fully disclosed and claimed in a copending application of A. J. Spisak and L. E. Nagoda, Ser. No. 232,084, filed Mar. 6, 1972, and assigned to the assignee of the present invention.

Figure 5A:
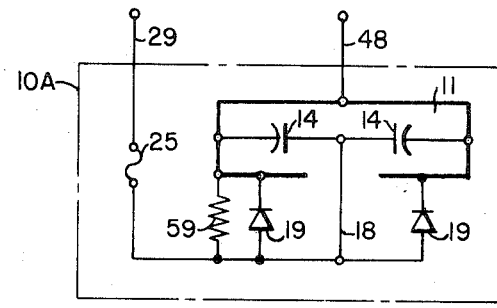
FIGS. 5A and 5B are schematic diagrams showing the electrical circuit of the rectifier module.
Figure 5B:
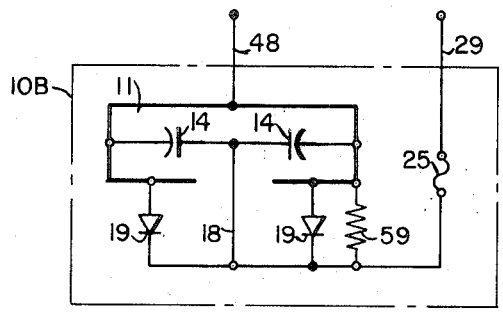

The electrical circuits of the modules 10 are shown in FIGS. 5A and 5B. Thus, the module 10A shown in FIG. 5A has two diodes 19 in parallel, with two capacitors 14 across the diodes, and connected in series with the fuse 25. The base member 11, which is a conductive container as previously described, is shown diagrammatically connected to a terminal member 48 and the terminal 29 of the fuse 25 is also indicated. It will be noted that a resistor 59 has been shown across the diodes 19. It will be understood that any desired or necessary resistors may be included in the assembly for voltage dividing or other purposes. Thus, a resistor 59 might be mounted on one or more of the posts 22, or incorporated in the posts, and connected in the circuit in any desired manner, and if a resistor is necessary or desirable in series with the capacitors 14 it may be carried on the conducting member 18 or incorporated in the member 18. Thus, any desired circuit configuration including any necessary components may be utilized. The rectifier module 10B shown in FIG. 5B has the same circuit as that of the module 10A but the polarity of the diodes 19 is reversed in FIG. 5B with respect to the terminals 29 and 48.

Figure 6:
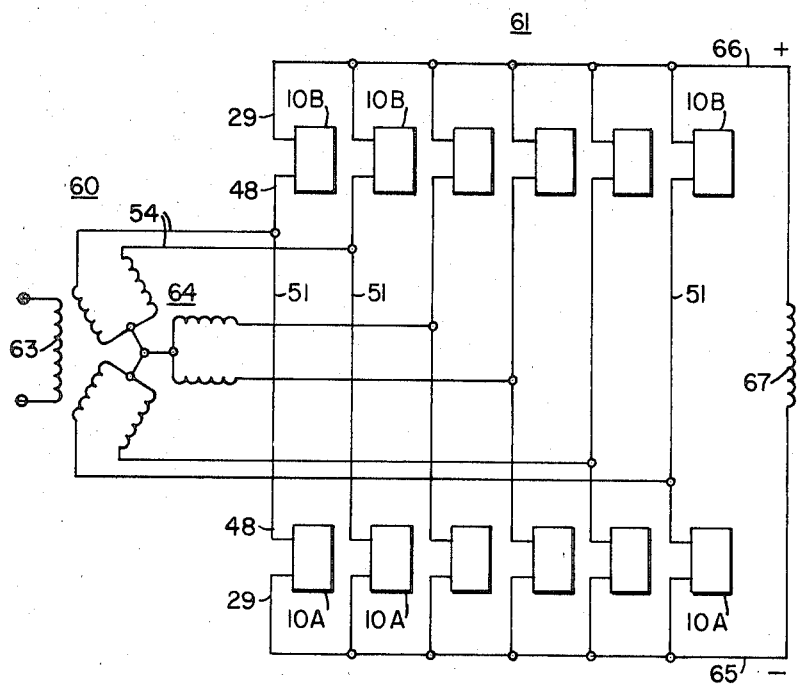
FIG. 6 is a somewhat simplified schematic diagram of a brushless excitation system.

The necessary number of modules 10A are mounted on one of the wheels 36 and a corresponding number of modules 10B is mounted on the other wheel 37. The modules on the two wheels are connected as previously described. The effect of this is shown in FIG. 6 which is a schematic diagram of a brushless excitation system. As there shown, the system includes an alternating current exciter 60 and a rotating rectifier assembly 61 supplying field excitation to a main alternating current generator 62. The alternating current exciter 60 has a stationary field structure carrying a field winding 63 excited with direct current from any suitable source. The exciter 60 has a rotating armature 64 shown as having a three-phase winding with each phase consisting of two parallel branches. It will be understood, of course, that any necessary or desirable number of parallel branches, and any suitable circuit configuration, may be utilized. In the particular arrangement shown in FIG. 6 one rectifier module is provided on each wheel for each branch of the exciter armature winding, although it will be understood that other arrangements might be utilized. The rectifier modules 10A on one wheel are all connected to the wheel rim by the fuse terminals 29 so that the wheel rim serves as an output bus 65, while the modules 10B are similarly connected by their fuse terminals 29 to the other wheel rim which thus serves as the other output bus 66. The terminals 48 of corresponding modules are connected to each other by the connectors 51, as previously described, and to leads 54 from the exciter armature 64. It will be seen that this results in a three-phase rectifier bridge circuit as clearly shown in FIG. 6. The wheel rims 42 constitute the output buses 65 and 66 which are connected to axial leads 56 (FIG. 3) to supply direct current excitation to the field winding 67 of the main generator 62. The generator 62 has a stationary armature winding 68, while the exciter armature 64, rotating rectifier assembly 61, and generator field winding 67 are all on the rotating elements and rotate together to provide a brushless excitation system.

Figure 8:
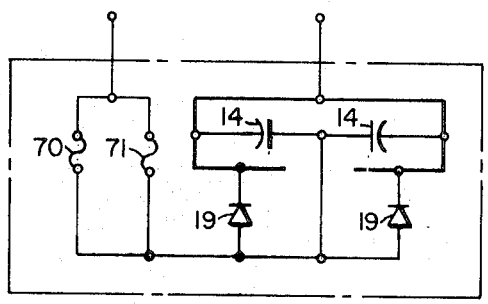
FIGS. 8 and 9 are schematic diagrams showing electrical circuits for the module of FIG. 7.
Figure 9:
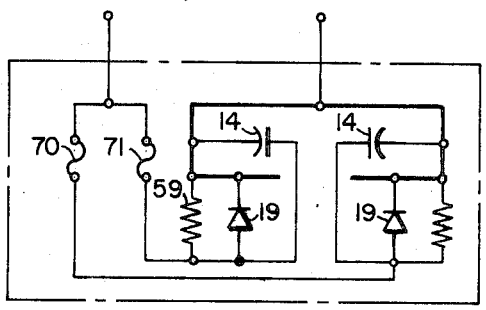

It will be seen that a modular rectifier assembly has been provided which is readily assembled on the support wheels and which provides a simple and compact construction. It will be understood that the rectifier module may be modified in any desired manner such as by incorporating any necessary resistors as previously mentioned. It will also be understood that although two parallel diode assemblies have been shown in each module, it would be possible to use only one diode assembly, or if desired more than two such assemblies may be utilized and supported on a common base member in the manner shown. Another modification is shown in FIG. 7 which is a view generally similar to FIG. 1 and corresponding elements have been identified by the same reference numerals. In the module of FIG. 7, however, two fuses 70 and 71 are provided. The fuse 71 is attached to the base member 11 by a lug 26 and strap 27 as previously described. A metal bracket 72 extends across the two fuses 70 and 71 and is connected to them by screws 73 for both mechanical and electrical connection. The terminal bolt 30 extends through the bracket 72 for connection to the wheel rim 42 as before. The lower terminals 74 of the fuses are connected together by the connector 31 which is the same as previously described except that it is extended for connection to both of the fuses. In this configuration, therefore, the two fuses are connected in parallel and are in series with the paralleled diode assemblies as shown in the schematic diagram of FIG. 8. With this arrangement, as in the arrangement of FIG. 1, failure of any of the diodes will cause both fuses to blow and interrupt the circuit. Another arrangement is shown in FIG. 9 which may be used in cases where the circuit of the exciter armature requires or permits the diodes to operate seperately. In this configuration the physical arrangement would be as shown in FIG. 7 but the two fuses are separately connected to the two diodes so that each diode is separately protected by its own fuse.

What we claim is:

1. In a brushless excitation system including an alternating current exciter and a rotating rectifier assembly having at least one rectifier wheel mounted on a shaft and insulated therefrom, a recitifier module adapted to be mounted on said wheel, said module comprising a conducting base member, at least one diode assembly having a disc-type rectifier diode disposed between two metal heat sinks in electrical and thermal contact therewith, one of said heat sinks engaging the base member, spring means supported from the base member and applying a predetermined force to the other of said heat sinks to maintain contact between the base member and said one heat sink and between the heat sinks and the diode, a fuse supported on the base member, and means for electrically connecting the diode assembly to the fuse.

2. A rectifier module as defined in claim 1 in which the base member comprises a metal container, a capacitor disposed in the container, and means for connecting said capacitor across the diode assembly.

3. A rectifier module as defined in claim 2 including two diode assemblies engaging the base member, a conducting member connected to the capacitor and extending between said two diode assemblies, and a connector for electrically connecting together said conducting member, both diode assemblies and said fuse.

4. A rectifier module as defined in claim 3 in which each diode assembly has its own spring means, each of said spring means including insulating supports attached to the base member on opposite sides of the diode assembly, and a spring member secured to the supports and engaging the diode assembly.

5. A rectifier module as defined in claim 1 including two diode assemblies engaging the base member, a capacitor supported on the base member, a conducting member connected to the capacitor and extending parallel to the diode assemblies, and a connector for electrically connecting together said other heat sinks of both diode assemblies, said conducting member and said fuses.

6. A rectifier module as defined in claim 5 including two fuses mechanically attached to said base member, and said connector electrically connecting the diode assemblies to both said fuses in parallel.

7. A rectifier module as defined in claim 1 including two diode assemblies engaging the base member, capacitors connected across said diode assemblies, two fuses mechanically attached to said base member, and connecting means for electrically connecting said other heat sink of one diode assembly to one of said fuses and the other heat sink of the other diode assembly to the other of said fuses.

8. In a brushless excitation system including an alternating current exciter and a rotating rectifier assembly, said rectifier assembly including at least one rectifier wheel mounted on a shaft and having an axially extending rim portion, a plurality of rectifier modules mounted on said rim portion, each of said modules comprising a conducting base member engaging said rim portion and insulated therefrom, at least one diode assembly having a disc-type rectifier diode disposed between two metal heat sinks in electrical and thermal contact therewith, one of said heat sinks engaging the base member, spring means supported from the base member and applying a predetermined force to the other of said heat sinks to maintain contact between the base member and said one heat sink and between the heat sinks and the diode, a fuse mechanically attached to the base member, means for electrically connecting the diode assembly to the fuse, and means for removably securing the base member and the fuse to the rim portion, whereby the rectifier module is readily removable as a unit.

9. The combination of claim 8 in which the base member of each rectifier module comprises a metal container, a capacitor disposed in the container, and means for connecting the capacitor across the diode assembly.

10. The combination of claim 9 in which said securing means comprises a bolt extending through the wheel rim into the base member, means for insulating said bolt from the wheel, and a bolt securing the fuse to the end of the rim.

11. The combination of claim 8 in which the rotating rectifier assembly includes two rectifier wheels mounted on a shaft and insulated therefrom, the rectifier modules on one wheel being of opposite polarity from those mounted on one wheel being of opposite polarity from those mounted on the other wheel, a terminal member adjacent the base member of each module and electrically connected thereto, and means for electrically connecting the terminal members on one wheel to corresponding terminal members on the other wheel.

12. The combination of claim 11 in which the terminal members on one wheel also have means for effecting electrical connection to leads of the alternating current exciter, and means for effecting electrical connection of the wheels to direct current output leads.

References Cited

UNITED STATES PATENTS

| 2,897,383 | 7/1959 | Barrows et al. | 310—68 R |
| 3,368,091 | 2/1968 | Layman | 310—68 R |
| 3,573,516 | 4/1971 | Lyon et al. | 310—68 |
| 3,629,630 | 12/1971 | Cotton et al. | 310—68 |

FOREIGN PATENTS

| 1,017,026 | 1/1966 | Great Britain | 310—68 D |

DONOVAN F. DUGGAN, Primary Examiner

U.S. Cl. X.R.

310—72